United States Patent
Gwon et al.

(10) Patent No.: US 10,669,662 B2
(45) Date of Patent: Jun. 2, 2020

(54) METHOD OF CONTROLLING LAUNDRY TREATMENT APPARATUS

(71) Applicant: LG ELECTRONICS INC., Seoul (KR)

(72) Inventors: Hyeokjin Gwon, Seoul (KR); Sungha Ryu, Seoul (KR); Sanghyun Lee, Seoul (KR); Bonkwon Koo, Seoul (KR); Dongkyum Kim, Seoul (KR); Younghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/608,845

(22) Filed: May 30, 2017

(65) Prior Publication Data

US 2017/0342629 A1 Nov. 30, 2017

(30) Foreign Application Priority Data

May 31, 2016 (KR) .......................... 10-2016-0067635

(51) Int. Cl.
*D06F 37/20* (2006.01)
*D06F 33/00* (2020.01)
(Continued)

(52) U.S. Cl.
CPC ............ *D06F 37/203* (2013.01); *D06F 33/00* (2013.01); *D06F 34/18* (2020.02); *D06F 34/22* (2020.02);
(Continued)

(58) Field of Classification Search
CPC .................................................... D06F 37/203
See application file for complete search history.

(56) References Cited

U.S. PATENT DOCUMENTS

2014/0021140 A1  1/2014  Hwang
2014/0083142 A1  3/2014  Chung et al.

FOREIGN PATENT DOCUMENTS

CN   104919106    9/2015
EP   1 995 366    11/2008
(Continued)

OTHER PUBLICATIONS

Korean Notice of Allowance dated Apr. 5, 2017 issued in Application No. 10-2016-0067635 (English translation only).
(Continued)

*Primary Examiner* — Jason Y Ko
(74) *Attorney, Agent, or Firm* — KED & Associates, LLP (57) ABSTRACT

A control method of a laundry treatment apparatus is disclosed. The control method includes rotating the drum at a predetermined first number of rotations to measure the weight of the laundry stored in the drum (a laundry weight measurement step), rotating the drum at a predetermined second number of rotations to determine the magnitude of the dynamic unbalance of the drum (an unbalance measurement step), accelerating the drum to a target number of rotations, which is greater than the first number of rotations and the second number of rotations, when the magnitude of the dynamic unbalance measured at the unbalance measurement step is less than a predetermined reference value (an acceleration step), interrupting the rotation of the drum when the variation per unit time of current supplied to the stator during execution of the acceleration step is equal to or greater than a predetermined reference variation (a first interruption step), rotating the drum at the first number of rotations to determine the weight of the laundry stored in the drum (a laundry weight remeasurement step), and interrupting the rotation of the drum when the deviation between the laundry weight measured at the laundry weight remeasurement step and the laundry weight measured at the laundry (Continued)

weight measurement step is equal to or greater than a predetermined reference deviation (a second interruption step).

15 Claims, 5 Drawing Sheets

(51) Int. Cl.
*D06F 34/18* (2020.01)
*D06F 34/22* (2020.01)
*D06F 35/00* (2006.01)
*G01D 3/036* (2006.01)

(52) U.S. Cl.
CPC ......... *D06F 35/007* (2013.01); *G01D 3/0365* (2013.01)

(56) References Cited

FOREIGN PATENT DOCUMENTS

| | | |
|---|---|---|
| KR | 10-2006-0078026 | 7/2003 |
| KR | 10-2009-0047231 | 5/2009 |
| KR | 10-2009-0080315 | 7/2009 |
| KR | 10-2012-0109172 | 10/2012 |
| KR | 10-2015-0044305 | 4/2015 |

OTHER PUBLICATIONS

European Search Report dated Nov. 10, 2017 issued in Application No. 17173492.4.
International Search Report (English Translation) and Written Opinion (English Translation) dated Aug. 30, 2017 issued in Application No. PCT/KR2017/005642.
Chinese Office Action dated Oct. 14, 2019 issued in CN Application No. 201780001055.6.

METHOD OF CONTROLLING LAUNDRY TREATMENT APPARATUS

CROSS-REFERENCE TO RELATED APPLICATION

This application claims the benefit of Korean Patent Application No. 10-2016-0067635, filed on May 31, 2016, which is hereby incorporated by reference as if fully set forth herein.

BACKGROUND OF THE INVENTION

Field of the Invention

The present invention relates to a control method of a laundry treatment apparatus.

Discussion of the Related Art

Generally, a laundry treatment apparatus is a concept including an apparatus that washes laundry, an apparatus that dries laundry, and an apparatus that is capable of washing and drying laundry.

Some conventional laundry treatment apparatuses include a cabinet, a tub provided in the cabinet for storing water, a drum rotatably provided in the tub for storing laundry, and a driving unit for rotating the drum.

The conventional laundry treatment apparatus may vibrate during the rotation of the drum. If the vibration of the laundry treatment apparatus is great, the laundry treatment apparatus may be overturned. For this reason, it is necessary to provide a means for sensing whether the laundry treatment apparatus has been overturned.

That is, the conventional laundry treatment apparatus needs an additional means for determining whether the laundry treatment apparatus has been overturned. A representative example of such an overturn sensing means has been overturned is a sensor including a coil and a piece of metal configured to be displaceable in order to change the inductance of the coil.

However, the structure of the overturn sensing means included in the conventional laundry treatment apparatus is complicated, and it is not possible for a controller to recognize variation in the inductance of the coil.

SUMMARY OF THE INVENTION

Accordingly, the present invention is directed to a control method of a laundry treatment apparatus that substantially obviates one or more problems due to limitations and disadvantages of the related art.

One object of the present invention is to provide a control method of a laundry treatment apparatus that is capable of determining whether the laundry treatment apparatus has been turned over (overturned) without an additional sensor for determining whether the laundry treatment apparatus has been overturned.

Another object of the present invention is to provide a control method of a laundry treatment apparatus that is capable of determining whether the laundry treatment apparatus has been overturned based on the fact that the amount of current supplied to a driving unit for rotating a drum in the state in which the laundry treatment apparatus is not overturned is different from the amount of current supplied to the driving unit for rotating the drum having the same load (the same laundry weight) in the state in which the laundry treatment apparatus has been overturned.

Another object of the present invention is to provide a control method of a laundry treatment apparatus that is capable of determining whether the laundry treatment apparatus has been overturned by measuring the amount of current supplied to a driving unit for rotating a drum in which laundry is stored.

Another object of the present invention is to provide a control method of a laundry treatment apparatus that is capable of at least twice performing a step of determining the laundry weight based on the amount of current supplied to a driving unit for rotating a drum and comparing the measured values of the laundry weight to determine whether the laundry treatment apparatus has been overturned.

A further object of the present invention is to provide a control method of a laundry treatment apparatus that is capable of at least twice measuring the magnitude of the mass unbalance (dynamic unbalance) of a drum in the circumferential direction about the center of rotation based on the amount of current supplied to a driving unit for rotating the drum and comparing the measured magnitudes of the dynamic unbalance to determine whether the laundry treatment apparatus has been overturned.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

To achieve these objects and other advantages and in accordance with the purpose of the invention, as embodied and broadly described herein, in accordance with an aspect of the present invention, a control method of a laundry treatment apparatus, including a tub configured to provide a space for storing water, a drum provided in the tub for storing laundry, a stator configured to generate a rotating field when current is supplied to the stator, a rotor configured to be rotated by the rotating field generated by the stator, and a rotary shaft extending through the tub for connecting the rotor to the drum, includes rotating the drum at a predetermined first number of rotations to measure the weight of the laundry stored in the drum (a laundry weight measurement step), rotating the drum at a predetermined second number of rotations to determine the magnitude of the dynamic unbalance of the drum (an unbalance measurement step), accelerating the drum to a target number of rotations, which is greater than both the first number of rotations and the second number of rotations, when the magnitude of the dynamic unbalance measured at the unbalance measurement step is less than a predetermined reference value (an acceleration step), interrupting the rotation of the drum when the variation per unit time of current supplied to the stator during execution of the acceleration step is equal to or greater than a predetermined reference variation (a first interruption step), rotating the drum at the first number of rotations to determine the weight of the laundry stored in the drum (a laundry weight remeasurement step), and interrupting the rotation of the drum when the deviation between the laundry weight measured at the laundry weight remeasurement step and the laundry weight measured at the laundry weight measurement step is equal to or greater than a predetermined reference deviation (a second interruption step).

The control method may further include maintaining the number of rotations of the drum at the target number of rotations when the deviation between the laundry weight measured at the laundry weight remeasurement step and the laundry weight measured at the laundry weight measurement step is less than the reference deviation (a spin-drying step).

The control method may further include maintaining the number of rotations of the drum at the target number of rotations when the variation per unit time of current supplied to the stator during execution of the acceleration step is less than the reference variation (a spin-drying step).

The laundry weight measurement step and the laundry weight remeasurement step may be performed to determine the laundry weight based on the amount of current supplied to the stator to accelerate the drum to the first number of rotations or to maintain the number of rotations of the drum at the first number of rotations.

The second interruption step may be performed when the deviation between the amount of current supplied to the stator at the laundry weight remeasurement step and the amount of current supplied to the stator at the laundry weight measurement step is equal to or greater than the reference variation.

The reference deviation may be set to a deviation between the amount of current supplied to the stator to rotate the drum at the first number of rotations in the state in which the laundry treatment apparatus has been overturned and the amount of current supplied to the stator to rotate the drum in which the same weight of laundry is stored at the first number of rotations in the state in which the laundry treatment apparatus is not overturned.

The control method may further include rotating the drum at the second number of rotations to remeasure the magnitude of the dynamic unbalance of the drum when the deviation between the laundry weight measured at the laundry weight remeasurement step and the laundry weight measured at the laundry weight measurement step is less than the reference deviation (an unbalance remeasurement step), wherein the second interruption step may be performed when the deviation between the dynamic unbalance measured at the unbalance remeasurement step and the dynamic unbalance measured at the unbalance measurement step is equal to or greater than a predetermined reference unbalance deviation.

The unbalance measurement step and the unbalance remeasurement step may be performed to determine the magnitude of the dynamic unbalance based on the amount of current supplied to the stator to maintain the number of rotations of the drum at the second number of rotations or to accelerate the drum to the second number of rotations, and the second interruption step may be performed when the deviation between the amount of current supplied to the stator at the unbalance remeasurement step and the amount of current supplied to the stator at the unbalance measurement step is equal to or greater than the reference unbalance deviation.

The reference unbalance deviation may be set to a deviation between the amount of current supplied to the stator to rotate the drum at the second number of rotations in the state in which the laundry treatment apparatus has been overturned and the amount of current supplied to the stator to rotate the drum in which the same weight of laundry is stored at the second number of rotations in the state in which the laundry treatment apparatus is not overturned.

The control method may further include maintaining the number of rotations of the drum at the target number of rotations when the deviation between the dynamic unbalance measured at the unbalance remeasurement step and the dynamic unbalance measured at the unbalance measurement step is less than the reference unbalance deviation (a spin-drying step).

The control method may further include rearranging the laundry stored in the drum when the magnitude of the dynamic unbalance measured at the unbalance measurement step is equal to or greater than the reference value (a laundry untangling step), wherein the laundry untangling step may include interrupting the rotation of the drum, supplying water to the tub, rotating the drum, and draining the water from the tub.

The unbalance measurement step may include measuring the magnitude of the dynamic unbalance while rotating the drum at the second number of rotations, which is less than the first number of rotations (a first unbalance measurement step) and measuring the magnitude of the dynamic unbalance while accelerating the drum to a third number of rotations, which is greater than the second number of rotations and less than the target number of rotations (a second unbalance measurement step), and the acceleration step may be performed when the magnitude of the dynamic unbalance measured at the first unbalance measurement step is less than a predetermined first reference value and when the magnitude of the dynamic unbalance measured at the second unbalance measurement step is less than a predetermined second reference value.

The control method may further include remeasuring the magnitude of the dynamic unbalance while maintaining the number of rotations of the drum at the second number of rotations when the deviation between the laundry weight measured at the laundry weight remeasurement step and the laundry weight measured at the laundry weight measurement step is less than the reference deviation (a first unbalance remeasurement step), wherein the second interruption step may be performed when the deviation between the dynamic unbalance measured at the first unbalance remeasurement step and the dynamic unbalance measured at the first unbalance measurement step is equal to or greater than a predetermined first reference unbalance deviation.

The control method may further include remeasuring the magnitude of the dynamic unbalance while accelerating the drum to the third number of rotations when the deviation between the dynamic unbalance measured at the first unbalance remeasurement step and the dynamic unbalance measured at the first unbalance measurement step is less than the first reference unbalance deviation (a second unbalance remeasurement step), wherein the second interruption step may be performed when the deviation between the dynamic unbalance measured at the second unbalance remeasurement step and the dynamic unbalance measured at the second unbalance measurement step is equal to or greater than a predetermined second reference unbalance deviation.

The control method may further include maintaining the number of rotations of the drum at the target number of rotations (a spin-drying step), wherein the spin-drying step may be performed when the deviation between the laundry weight measured at the laundry weight remeasurement step and the laundry weight measured at the laundry weight measurement step is less than the reference deviation, when the deviation between the dynamic unbalance measured at the first unbalance remeasurement step and the dynamic unbalance measured at the first unbalance measurement step is less than the first reference unbalance deviation, and when the deviation between the dynamic unbalance measured at the second unbalance remeasurement step and the dynamic unbalance measured at the second unbalance measurement step is less than the second reference unbalance deviation.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings:

FIG. 4 is a view showing a further embodiment of the control method of the laundry treatment apparatus according to the present invention, wherein

DETAILED DESCRIPTION OF THE INVENTION

Hereinafter, exemplary embodiments of the present invention will be described in detail with reference to the accompanying drawings. Meanwhile, the configuration of a laundry treatment apparatus or a control method of the laundry treatment apparatus, which will be described below, is merely given to describe the embodiments of the present invention, without being intended to limit the scope of the present invention. The same reference numerals used throughout the specification refer to the same constituent elements.

Figure 1:
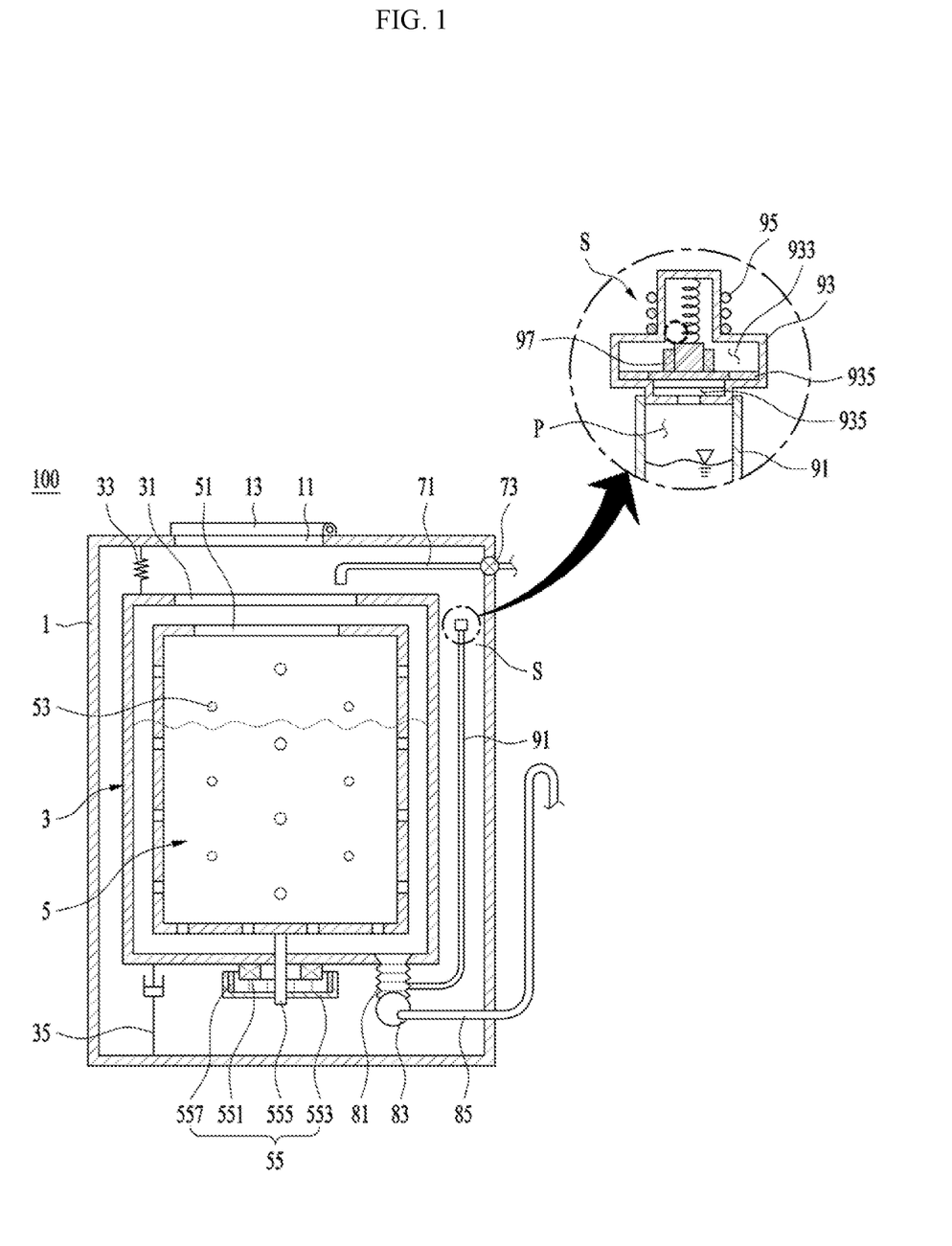
FIG. 1 is a view showing an embodiment of a laundry treatment apparatus according to the present invention.

As shown in FIG. 1, a laundry treatment apparatus 100 according to the present invention includes a cabinet 1, a tub 3 provided in the cabinet for storing water, and a drum 5 rotatably provided in the tub for storing laundry.

The cabinet 1 includes an introduction port 11, through which laundry is introduced, and a door 13 for opening and closing the introduction port. The introduction port 11 may be provided parallel to the bottom surface of the cabinet. In this case, the door 13 may be hingedly connected to the upper surface of the cabinet for opening and closing the introduction port 11.

The tub 3 is provided in the upper surface thereof with a tub introduction port 31 communicating with the introduction port 11. The tub 3 may be fixed in the cabinet 1 via a support unit. The support unit may include a spring 33 for connecting the upper surface of the tub 3 to the cabinet 1 and a damper 35 for connecting the bottom surface of the tub 3 to the cabinet.

The tub 3 receives water through a water supply unit and discharges the water stored therein out of the cabinet through a drainage unit.

The water supply unit may include a water supply pipe 71 connected to a water supply source for guiding water to the tub 3 and a water supply valve 73 for opening and closing the water supply pipe 71.

The drainage unit may include a first drainage pipe 81 connected to the tub, a drainage pump 83 for discharging the water in the tub out of the tub through the first drainage pipe, and a second drainage pipe 85 for guiding the water discharged by the drainage pump out of the cabinet 1.

The drum 5 may be formed in any shape as long as the drum 5 is rotatable in the tub 3. FIG. 1 shows the case in which the drum is formed in a cylindrical shape by way of example.

The drum 5 is provided in the upper surface thereof with a drum introduction port 51. The drum introduction port 51 is configured to communicate with the introduction port 11 and the tub introduction port 31. After opening the door 13, therefore, a user may introduce laundry into the drum 5 through the introduction port 11.

The drum 5 is provided in the circumferential surface and the bottom surface thereof with a plurality of through-holes 53, which are formed through the drum. Consequently, the water supplied to the tub 3 may flow into the drum 5 through the through-holes 53. In addition, the water contained in the laundry may flow to the tub 3 through the through-holes 53 due to the centrifugal force generated during the rotation of the drum.

The drum 5 having the above structure may be rotated by a driving unit 55.

The driving unit 55 may include a stator 551 for generating a rotating field when current is supplied to the stator, a rotor 553 configured to be rotated by the rotating field, and a rotary shaft 555 extending through the tub 3 for connecting the rotor 553 to the drum 3.

The stator 551 is fixed to the tub 3, and a plurality of permanent magnets 557, arranged such that different polarities are alternately exposed, is fixed to the rotor 553. When the rotating field is generated by the stator 551, therefore, the permanent magnets 557 move along the rotating field, whereby the rotor 553 and the rotary shaft 555 are rotated.

The laundry treatment apparatus according to the present invention may further include a speed sensing unit (not shown) for sensing the number of rotations of the drum. The speed sensing unit may be configured to determine the number of rotations of the drum by sensing the change in magnetic force of the permanent magnets 557 fixed to the rotor.

As previously described, the permanent magnets 557 are fixed to the rotor 553 such that the different polarities are alternately exposed. The number of permanent magnets is fixed at the time of designing the laundry treatment apparatus, with the result that the distance between the respective permanent magnets is also fixed. When the speed sensing unit is fixed to the stator 551 so as to sense the magnetic force of the permanent magnets, therefore, a controller (or speed sensing unit) may sense the number of rotations of the rotor (the number of rotations of the drum) based on the time taken to sense the N and S poles of the permanent magnets 557 and the distance between the respective permanent magnets.

Meanwhile, the amount of water stored in the tub 3 may be measured by a water level sensing unit. The water level sensing unit may include a communication pipe 91 configured to communicate with the tub 3 and a sensing unit S for generating an electrical signal in response to the change in pressure in the communication pipe 91.

The communication pipe 91 may be formed in any shape as long as the communication pipe 91 communicates with the tub 3. FIG. 1 shows the case in which the communication pipe 91 communicates with the tub 3 via the first drainage pipe 81 by way of example.

The sensing unit S may include a housing 93 having a first chamber 931 and a second chamber 933, a partition 935 provided in the housing 93 for partitioning the first chamber 931 and the second chamber 933 from each other, a coil 95 wound around the housing, and a core 97 fixed to the partition 935 for changing the inductance of the coil during the movement of the partition 935. The core 97 may be made of a metal.

The first chamber 931 communicates with the interior of the communication pipe 91, and the second chamber 933 does not communicate with the communication pipe 91 due to the partition 935. The partition 935 may be formed in any shape as long as the partition 935 partitions the first chamber 931 and the second chamber 933 from each other. FIG. 1 shows a diaphragm fixed to the housing 93 by way of example.

Meanwhile, the second chamber 933 may be provided with an elastic body 937 for pushing the partition 935 toward the first chamber 931.

Since the level of water in the communication pipe 91 is changed depending on the level of water in the tub 3, the volume of a space P defined between the surface of the water stored in the communication pipe 91 and the first chamber 931 is changed depending on the level of water in the tub 3.

Since the position of the partition 935 is changed depending the change in volume (the change in pressure) of the space P and the inductance of the coil 95 is changed as the position of the partition 935 is changed, a controller (not shown) may estimate the level of water in the tub 3 based on the inductance of the coil 95.

Meanwhile, when the water in the tub is drained out of the cabinet through the drainage unit, the pressure of the space P is lowered. As a result, the partition 935 may be returned to the initial position thereof by the elastic body 937.

The laundry treatment apparatus having the above structure may be turned over (overturned) depending to the magnitude of vibration generated during the rotation of the drum 5. The overturning of the laundry treatment apparatus having the structure shown in FIG. 1 means that the introduction port 11, which is parallel to the bottom surface of the cabinet 1, does not remain parallel to the bottom surface of the cabinet 1. For example, the outer circumferential surface of the cabinet 1 contacts the ground, with the result that the introduction port 11 is perpendicular to the ground.

When the laundry treatment apparatus is operated in the state of being overturned, the driving unit or the drum may be damaged. For this reason, it is necessary to sense whether the laundry treatment apparatus has been overturned and to stop the operation of the laundry treatment apparatus upon sensing that the laundry treatment apparatus has been overturned.

In a conventional laundry treatment apparatus, a ball (indicated by a dotted line), made of a metal, is placed in the second chamber 933, and the inductance of the coil 95, changed due to the ball, is sensed to determine whether the laundry treatment apparatus has been overturned.

In the conventional laundry treatment apparatus, however, the structure of the water level sensing unit 9 is complicated, and it is difficult for the controller (not shown) to recognize the variation of inductance due to the ball.

Figure 2:
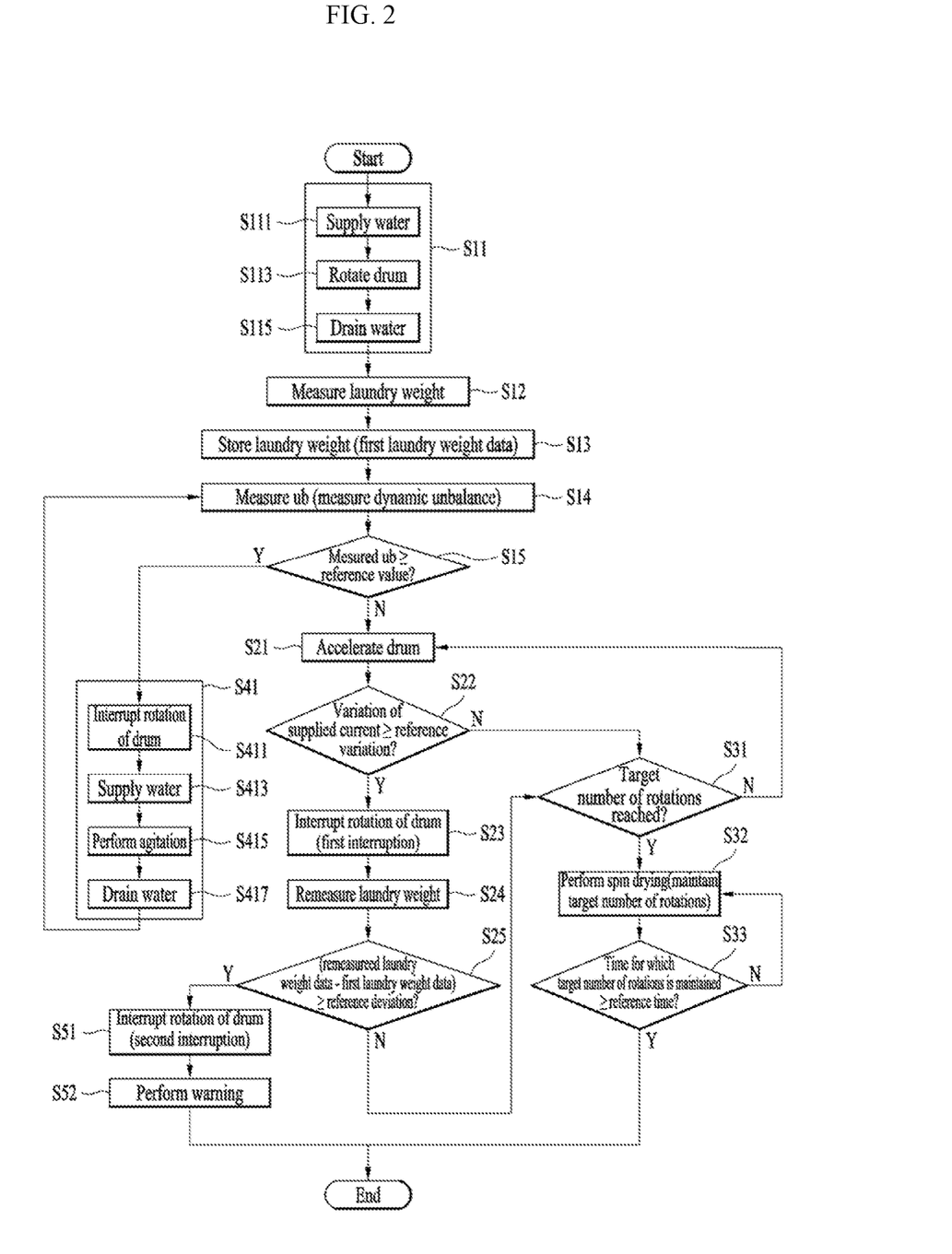
FIG. 2 is a view showing an embodiment of a control method of a laundry treatment apparatus according to the present invention.

Unlike the conventional laundry treatment apparatus, the present invention provides a control method of the laundry treatment apparatus that is capable of determining whether the laundry treatment apparatus has been overturned based on the amount of current that is supplied to the stator 551, an example of which is shown in FIG. 2.

As shown in FIG. 2, the control method of the laundry treatment apparatus may include a step (S11) of washing laundry.

The washing step (S11), which is a step of washing or rinsing laundry, may include a step (S111) of supplying water to the tub 3 through the water supply valve 73 under the control of the controller, a step (S113) of supplying current to the stator 551 to rotate the drum, and a drainage step (S115) of discharging the water from the tub through the drainage pump 83 after rotating the drum for a predetermined time.

When the washing step (S11) is completed, a spin-drying step (S32) is performed. The spin-drying step (S32) is a step of rotating the drum a predetermined target number of rotations for a predetermined reference time (spin-drying time) to separate water or foreign matter from the laundry.

However, the control method according to the present invention is characterized in that, after the completion of the washing step (S11), a laundry weight measurement step (S12), an unbalance measurement step (S14), and an acceleration step (S21) are performed, and the spin-drying step (S32) is performed only in the case in which a predetermined condition is satisfied, but a user is informed that the laundry treatment apparatus has been overturned in the case in which the predetermined condition is not satisfied.

The laundry weight measurement step (S12) is a step of measuring the weight of the laundry stored in the drum. As the laundry weight measurement step (S12), the amount of current supplied to the stator 551 to accelerate the drum to a predetermined first number of rotations may be measured to determine the laundry weight.

That is, the laundry weight measurement step (S12) is a step of comparing the amount of current supplied to the stator 551 to accelerate the drum to the first number of rotations with experimental data, obtained through experimentation (data about the amount of current that is supplied to the stator to accelerate the drum to the first number of rotations for each laundry weight) and stored in the controller or a storage means, to determine the weight of the laundry stored in the drum.

When the laundry weight measurement step (S12) is completed, data about the laundry weight (first laundry weight data) may be stored (S13), which is used at a laundry weight comparison step (S25), a description of which will follow.

Meanwhile, the laundry weight measurement step (S12) may be performed to determine the weight of the laundry stored in the drum based on the amount of current supplied to the stator to maintain the number of rotations of the drum at the first number of rotations. In this case, the experimental data must be set to an experimental value of the amount of current that is supplied to the stator to maintain the number of rotations of the drum at the first number of rotations for a predetermined time for each laundry weight.

Subsequently, the unbalance measurement step (S14) of measuring the magnitude of the dynamic unbalance of the drum is performed.

In the laundry treatment apparatus, dynamic unbalance means mass unbalance of the drum in the circumferential direction about the center of rotation. The unbalance measurement step (S14) of measuring the magnitude of the dynamic unbalance is a step of measuring the extent of mass unbalance of the drum in the circumferential direction about the rotary shaft 555.

At the unbalance measurement step (S14), the amount of current supplied to the stator 551 to accelerate the drum to a predetermined second number of rotations or to maintain the number of rotations of the drum at the second number of rotations for a predetermined time is measured to determine the extent of the dynamic unbalance.

The second number of rotations may be set to be equal to or less than the first number of rotations.

The higher the extent of the dynamic unbalance, the greater the vibration that is generated in the drum. The greater the vibration of the drum, the greater the deviation in the number of rotations of the drum during one rotation of the drum. When the dynamic unbalance is higher, therefore, the amount of current to be supplied to the stator to rotate the drum at the second number of rotations may be increased.

Consequently, the controller may estimate the extent or magnitude of the dynamic unbalance generated in the drum by comparing the amount of current that is supplied to the stator 551 while the drum is accelerated to the second number of rotations (or while the number of rotations of the drum is maintained at the second number of rotations) with experimental data (data about the amount of current that is supplied to the stator to rotate the drum at the second number of rotations for each magnitude of the dynamic unbalance).

When the magnitude of the dynamic unbalance generated in the drum is measured at the unbalance measurement step (S14), a step (S15) of determining whether the magnitude of the dynamic unbalance is equal to or greater than a predetermined reference value is performed.

The reference value is set to the magnitude of the dynamic unbalance at which vibration greater than allowable vibration for the laundry treatment apparatus may occur when the drum is rotated at the target number of rotations (the number of rotations greater than the first number of rotations and the second number of rotations) set at the spin-drying step (S32).

When the spin-drying step (S32) is performed in the state in which the magnitude of the dynamic unbalance measured at the unbalance measurement step (S14) is equal to or greater than the reference value, large vibration may be generated in the laundry treatment apparatus, and the laundry treatment apparatus may be overturned by the vibration. When the magnitude of the dynamic unbalance measured at the unbalance measurement step (S14) is equal to or greater than the reference value, therefore, a laundry untangling step (S41) of reducing the magnitude of the dynamic unbalance is performed.

The laundry untangling step (S41) may include a step (S411) of interrupting the supply of current to the stator to stop the rotation of the drum, a water supply step (S413) of supplying water to the tub 3 through the water supply valve, an agitation step (S415) of supplying current to the stator to rotate the drum 5, and a step (S417) of draining water from the tub through the drainage pump 83. At the agitation step (S415), the drum may be alternately rotated in the clockwise direction and the counterclockwise direction.

When the laundry untangling step (S41) is completed, the unbalance measurement step (S14) is performed again.

Meanwhile, when the magnitude of the dynamic unbalance measured at the unbalance measurement step (S14) is less than the reference value, the acceleration step (S21) of accelerating the drum from the number of rotations set for the unbalance measurement step (S14) to the target number of rotations set for the spin-drying step (S32) is performed.

During the execution of the acceleration step (S21), a step (S22) of determining whether the variation of current that is supplied to the stator 551 is equal to or greater than a predetermined reference variation is performed.

The reference variation is experimental data about the variation per unit time of current supplied to the stator while the drum is accelerated from the second number of rotations (the number of rotations for unbalance measurement) to the target number of rotations (the number of rotations for spin drying) without overturning the laundry treatment apparatus. The reference variation may have different values depending on the magnitude of the dynamic unbalance, and may be stored in the controller or a storage means.

When the variation of current supplied to the stator 551 during the execution of the acceleration step (S21) is equal to or greater than the reference variation, therefore, there is a high possibility of the laundry treatment apparatus being in an abnormal state (e.g. that the laundry treatment apparatus has been overturned), rather than being in a normal state.

For the above reason, when the variation of current supplied to the stator during the execution of the acceleration step (S21) is equal to or greater than the reference variation, a step (S23) of interrupting the supply of current to the stator 551 to stop the rotation of the drum (a first interruption step) is performed.

When the rotation of the drum is stopped, a laundry weight remeasurement step (S24) and a laundry weight comparison step (S25) are performed to determine whether the laundry treatment apparatus has been overturned.

The laundry weight remeasurement step (S24) is a step of rotating the drum at the same number of rotations as the number of rotations set at the laundry weight measurement step (S12) (the first number of rotations) to determine the laundry weight.

The load of the driving unit when the laundry treatment apparatus of FIG. 1 has been overturned is different from the load of the driving unit when the laundry treatment apparatus is not overturned. That is, since the laundry treatment apparatus of FIG. 1 is configured such that the rotary shaft 555 is substantially perpendicular to the bottom surface of the cabinet (i.e. the rotary shaft 555 is perpendicular to the bottom surface of the cabinet within an assembly tolerance range), the load of the driving unit 55 when the laundry treatment apparatus has been overturned is greater than the load of the driving unit 55 when the laundry treatment apparatus is not overturned (as shown in FIG. 1).

This means that the amount of current to be supplied to the stator to rotate the drum in which the same weight of laundry is stored at the same number of rotations is changed when the laundry treatment apparatus has been overturned.

Upon sensing that the deviation between laundry weight data remeasured at the laundry weight remeasurement step (S24) and the first laundry weight data measured at the laundry weight measurement step (S12) and stored is equal to or greater than a predetermined reference deviation (S25), therefore, it is determined that the laundry treatment apparatus has been overturned, and the supply of current to the stator is interrupted to stop the rotation of the drum (S51) (a second interruption step).

A process of determining the deviation between the laundry weight data remeasured at the laundry weight remeasurement step (S24) and the first laundry weight data measured at the laundry weight measurement step (S12) and stored may be performed through comparison between the amount of current supplied to the stator at the laundry weight remeasurement step (S24) and the amount of current supplied to the stator at the laundry weight measurement step (S12).

The reference deviation may be set to a deviation between the amount of current supplied to the stator to rotate the drum at the first number of rotations when the laundry treatment apparatus has been overturned and the amount of current supplied to the stator to rotate the drum at the first number of rotations when the laundry treatment apparatus is not overturned. In this case, that the deviation between the amount of current measured at the laundry weight remeasurement step (S24) and the amount of current measured at the laundry weight measurement step (S12) is less than the reference deviation means that the laundry treatment apparatus is not overturned.

Meanwhile, unlike the embodiment shown in the figure, a step of determining whether the first laundry weight data is different from the remeasured laundry weight data may be performed, instead of the step (S25) of comparing the deviation between the remeasured laundry weight data and the first laundry weight data with the reference deviation. In this case, the second interruption step (S51) may be performed when the first laundry weight data is different from the remeasured laundry weight data.

In addition, the control method according to the present invention may further include a warning step (S52) of informing a user that the laundry treatment apparatus has been overturned through a speaker (not shown) or a display unit (not shown) provided in the laundry treatment apparatus.

Meanwhile, upon determining that the deviation between the remeasured laundry weight data and the first laundry weight data with the reference deviation is less than the reference deviation (S25) or upon determining that the variation of the current supplied to the stator during the execution of the acceleration step (S21) is less than the reference variation, the amount of current that is supplied to the stator is increased until the number of rotations of the drum reaches the target number of rotations (S31).

When the number of rotations of the drum reaches the target number of rotations (S31), the spin-drying step (S32) of maintaining the number of rotations of the drum at the target number of rotations is performed. After the spin-drying step (S32) is performed for the predetermined spin-drying time (the reference time), the control method according to the present invention is finished.

Figure 3:
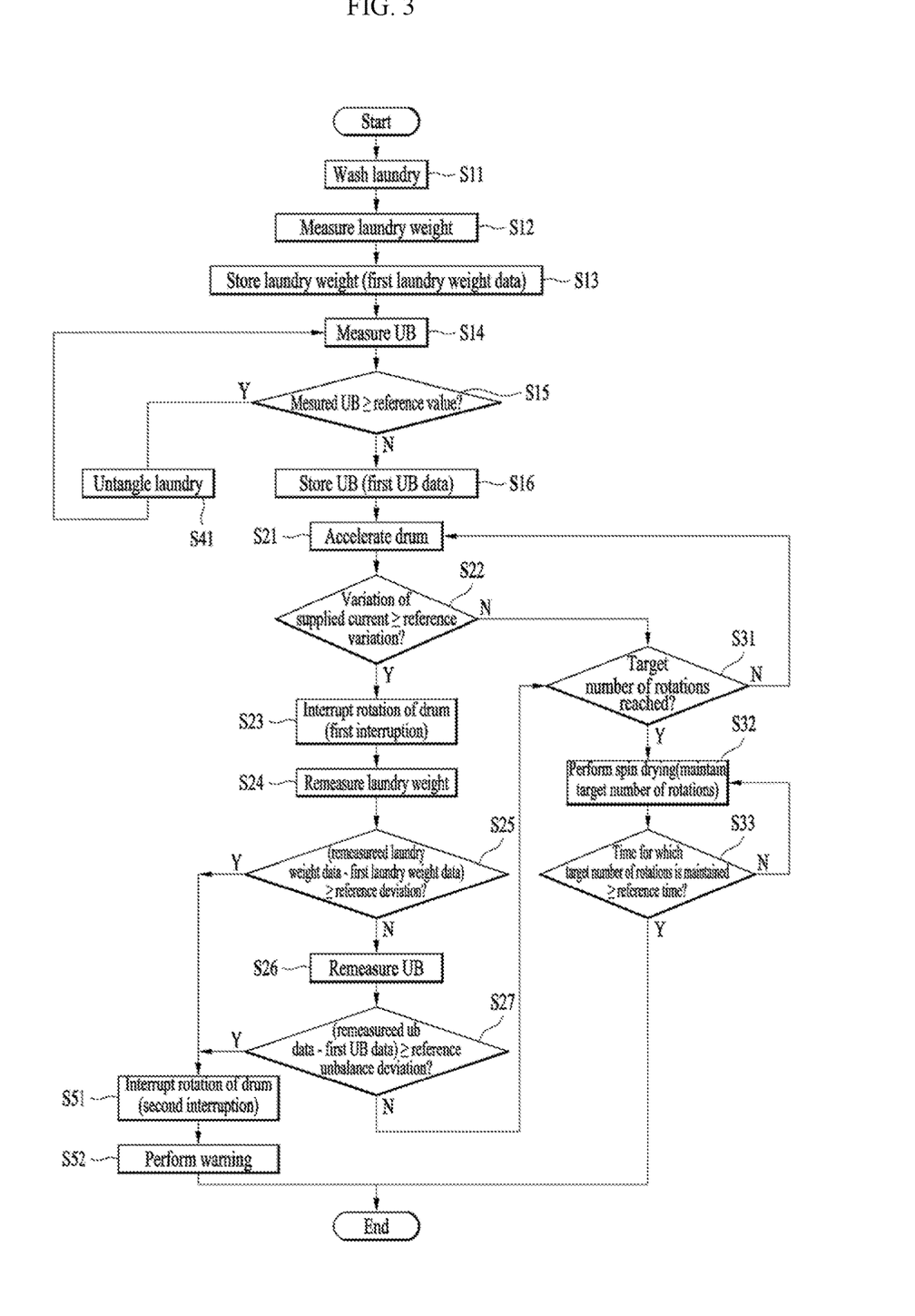
FIG. 3 is a view showing another embodiment of the control method of the laundry treatment apparatus according to the present invention.

FIG. 3 is a view showing another embodiment of the control method of the laundry treatment apparatus according to the present invention. As compared with the embodiment of FIG. 2, this embodiment is characterized in that whether the laundry treatment apparatus has been overturned is determined through the steps (S26 and S27) of comparing the magnitude of the dynamic unbalance.

In the control method according to this embodiment, an unbalance measurement step (S14) is performed after the completion of a washing step (S11) and laundry weight measurement and storage steps (S12 and S13).

When the magnitude of the dynamic unbalance measured at the unbalance measurement step (S14) is equal to or greater than a reference value, a laundry untangling step (S41) is performed. Upon determining that the magnitude of the dynamic unbalance measured at the unbalance measurement step (S14) is less than the reference value, however, the magnitude of the dynamic unbalance is stored (S16), and an acceleration step (S21) is performed.

When the variation of current supplied to the stator during the execution of the acceleration step (S21) is equal to or greater than a reference variation, the rotation of the drum is stopped (S23), and a laundry weight remeasurement step (S24) is performed.

When the deviation between laundry weight remeasured at the laundry weight remeasurement step (S24) (remeasured laundry weight data) and laundry weight measured at the laundry weight measurement step (S12) (first laundry weight data) is equal to or greater than a reference deviation, the rotation of the drum is stopped, and warning steps (S51 and S52) of warning that the laundry treatment apparatus has been overturned are performed.

When the deviation between the remeasured laundry weight data and the first laundry weight data is less than the reference deviation, however, an unbalance remeasurement step (S26) is performed.

When the deviation between the dynamic unbalance measured at the unbalance remeasurement step (S26) and the dynamic unbalance measured at the unbalance measurement step (S14) is less than a predetermined reference unbalance deviation, it is determined whether the number of rotations of the drum has reached a target number of rotations (S31), and spin-drying steps (S32 and S33) are performed.

When the deviation between the dynamic unbalance measured at the unbalance remeasurement step (S26) and the dynamic unbalance measured at the unbalance measurement step (S14) is equal to or greater than the reference unbalance deviation, however, the rotation of the drum is stopped (S51) (a second interruption step), and the warning step (S52) of informing a user that the laundry treatment apparatus has been overturned is performed.

The unbalance remeasurement step (S26) is a step of rotating the drum at the same number of rotations as the number of rotations at the unbalance measurement step (S14) to remeasure the magnitude of the dynamic unbalance of the drum. That is, the unbalance remeasurement step (S26) may be performed by measuring the amount of current supplied to the stator to increase the number of rotations of the drum to a second number of rotations or to maintain the number of rotations of the drum at the second number of rotations.

The load of the driving unit 55 when the laundry treatment apparatus has been overturned is different from the load of the driving unit 55 when the laundry treatment apparatus is not overturned. When the deviation between the magnitude of the dynamic unbalance (the amount of current) measured at the unbalance measurement step (S14) and the magnitude of the dynamic unbalance measured at the unbalance remeasurement step (S26) is equal to or greater than the reference unbalance deviation, therefore, it is determined that the laundry treatment apparatus has been overturned, and the rotation of the drum is stopped (S51).

The reference unbalance deviation may be set to a deviation between the amount of current supplied to the stator to rotate the drum at the second number of rotations when the laundry treatment apparatus has been overturned and the amount of current supplied to the stator to rotate the drum having the same load at the second number of rotations when the laundry treatment apparatus is not overturned. In this case, if the deviation between the amount of current measured at the unbalance remeasurement step (S26) and the amount of current measured at the unbalance measurement step (S14) is less than the reference unbalance deviation, this means that the laundry treatment apparatus is not overturned.

However, the step (S27) of comparing the deviation between the dynamic unbalance measured at the unbalance remeasurement step (S26) and the dynamic unbalance measured at the unbalance measurement step (S14) with the reference unbalance deviation may be performed by determining whether the amount of current measured at the unbalance measurement step (S14) and the amount of current measured at the unbalance remeasurement step (S26) are the same. In this case, the second interruption step (S51) is performed when the amount of current measured at the unbalance measurement step (S14) and the amount of current measured at the unbalance remeasurement step (S26) are different from each other, and the steps of rotating the drum at the target number of rotations (S31, S32, and S33) are performed when the amount of current measured at the unbalance measurement step (S14) and the amount of current measured at the unbalance remeasurement step (S26) are the same.

Figure 4A:
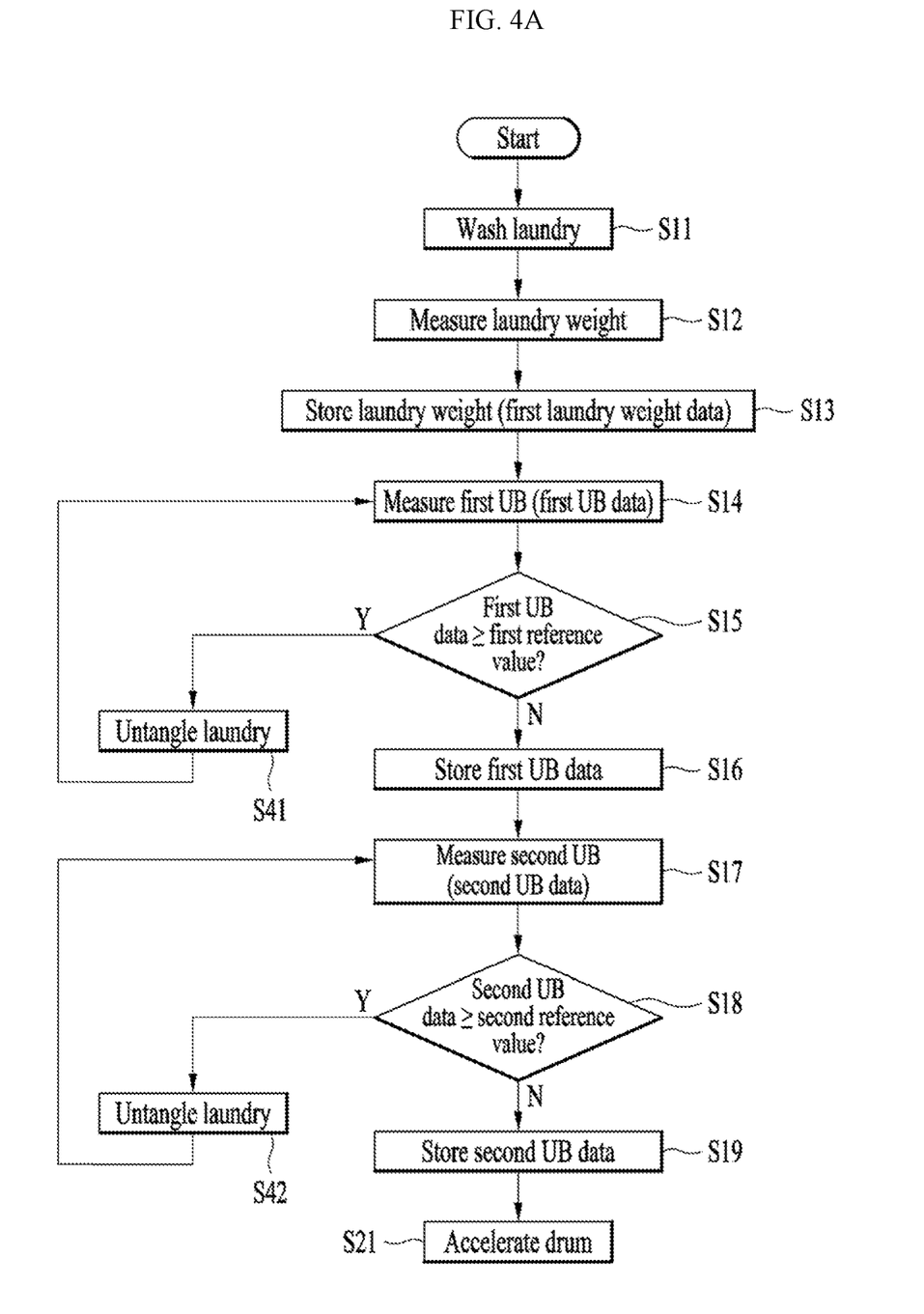
FIGS. 4A and 4B shows a series of control processes.
Figure 4B:
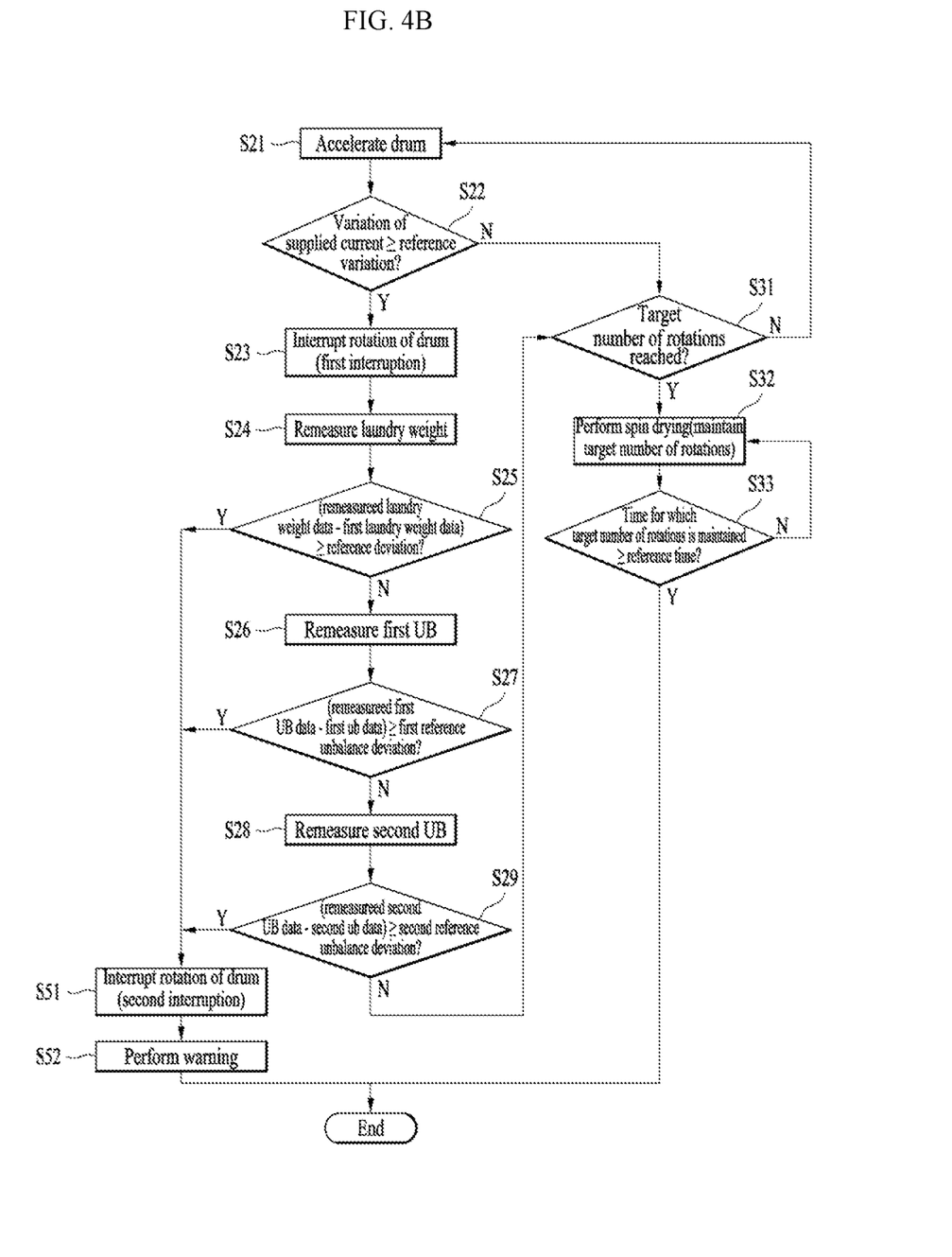

FIG. 4 is a view showing a further embodiment of the control method according to the present invention. The control method according to this embodiment is different from the control method according to the embodiment of FIG. 3 in that a dynamic unbalance measurement step is divided into a first unbalance measurement step (S14) and a second unbalance measurement step (S17) and in that a dynamic unbalance remeasurement step is divided into a first unbalance remeasurement step (S26) and a second unbalance remeasurement step (S28).

The control method according to this embodiment includes a step (S11) of washing laundry. The washing step has been described in detail above, and therefore a detailed description thereof will be omitted.

When the washing step (S11) is completed, a laundry weight measurement step (S12) of measuring the weight of laundry stored in the drum is performed, and data about the laundry weight is stored (S13).

Subsequently, a first unbalance measurement step (S14) of rotating the drum at a second number of rotations to measure the magnitude of the dynamic unbalance of the drum is performed.

The first unbalance measurement step (S14) may be performed by comparing the amount of current supplied to the stator 551 while the number of rotations of the drum is maintained at the second number of rotations with experimental data stored in the controller or the storage means (data about the amount of current that is supplied to the stator to rotate the drum at the second number of rotations for each magnitude of the dynamic unbalance).

When the magnitude of the dynamic unbalance generated in the drum (first unbalance data) is measured at the first unbalance measurement step (S14), a step (S15) of determining whether the measured magnitude of the dynamic unbalance is equal to or greater than a predetermined first reference value (S15) is performed.

The first reference value may be the magnitude of the dynamic unbalance at which vibration greater than allowable vibration for the laundry treatment apparatus may occur when the drum is rotated at a target number of rotations, set at a spin-drying step (S32), which may be data set through experimentation.

When the magnitude of the dynamic unbalance measured at the first unbalance measurement step (S14) is equal to or greater than the first reference value, a laundry untangling step (S41) of reducing the magnitude of the dynamic unbalance (a first laundry untangling step) is performed. The first laundry untangling step (S41) has been described in the embodiment of FIG. 2, and therefore a detailed description thereof will be omitted.

When the first laundry untangling step (S41) is completed, the first unbalance measurement step (S14) is performed again. When the magnitude of the dynamic unbalance measured at the first unbalance measurement step (S14) is less than the first reference value, first unbalance data is stored (S16).

Subsequently, a second unbalance measurement step (S17) of measuring the magnitude of the dynamic unbalance while the drum is accelerated to a third number of rotations, which is greater than the second number of rotations and less than the target number of rotations set at the spin-drying step (S32), is performed.

The second unbalance measurement step (S17) may be performed by comparing the amount of current supplied to the stator to accelerate the drum to the third number of rotations with experimental data stored in the controller or the storage means (data about the amount of current that is supplied to the stator to accelerate the drum to the third number of rotations for each magnitude of the dynamic unbalance).

When the magnitude of the dynamic unbalance generated in the drum (second unbalance data) is measured at the second unbalance measurement step (S17), a step (S18) of determining whether the measured magnitude of the dynamic unbalance is equal to or greater than a second reference value is performed.

The second reference value may be the magnitude of the dynamic unbalance at which vibration greater than allowable vibration for the laundry treatment apparatus may occur when the drum is rotated at the target number of rotations set at the spin-drying step (S32), which may be data set through experimentation. Since the number of rotations of the drum at the first unbalance measurement step is different from the number of rotations of the drum at the second unbalance measurement step, the second reference value may be set to a value different from the first reference value.

When the second unbalance data is equal to or greater than the second reference value, a second laundry untangling step (S42) of reducing the magnitude of the dynamic unbalance (a second laundry untangling step) is performed, and the second unbalance measurement step (S17) is performed again.

In this embodiment, two unbalance measurement steps are performed in order to minimize the possibility of the laundry treatment apparatus being overturned at the time of entry into the spin-drying step (S32) or during the execution of the spin-drying step through more accurate observation of the dynamic unbalance of the drum.

The first unbalance measurement step (S14) is performed to measure the dynamic unbalance while the number of rotations of the drum is maintained at the second number of rotations, and the second unbalance measurement step (S17) is performed to measure the dynamic unbalance while the drum is accelerated to the third number of rotations, which is greater than the second number of rotations and less than the target number of rotations. When the second unbalance measurement step (S17) is performed after the first unbalance measurement step (S14), the laundry in the drum may be rearranged while the drum is accelerated to the third number of rotations. As a result, it is possible to predict the possibility of the dynamic unbalance being increased at the spin-drying step (S32) of rotating the drum to the third number of rotations, thereby preventing abrupt increase in vibration of the laundry treatment apparatus during the execution of the spin-drying step.

When the dynamic unbalance measured at the second unbalance measurement step (S17) is less than the second reference value, the second unbalance data is stored (S19), and an acceleration step (S21) of accelerating the drum to the target number of rotations set at the spin-drying step (S32) is performed.

During the execution of the acceleration step (S21), a step (S22) of determining whether the variation of current that is supplied to the stator 551 is equal to or greater than a predetermined reference variation is performed.

When the variation of current supplied to the stator during the execution of the acceleration step (S21) is less than the reference variation, steps of maintaining the number of rotations of the drum at the target number of rotations (S31, S32, and S33) are performed.

When the variation of current supplied to the stator during the execution of the acceleration step (S21) is equal to or greater than the reference variation, however, a step (S23) of interrupting the supply of current to the stator 551 to stop the rotation of the drum (a first interruption step) is performed.

When the rotation of the drum is stopped, a laundry weight remeasurement step (S24) and a laundry weight comparison step (S25) are performed.

The laundry weight remeasurement step (S24) is a step of rotating the drum at the first number of rotations to determine the laundry weight, and the laundry weight comparison step (S25) is a step of determining whether the deviation between the laundry weight remeasured at the laundry weight remeasurement step (S24) (remeasured laundry weight data) and the laundry weight measured at the laundry weight measurement step (S12) (first laundry weight data) is equal to or greater than a predetermined reference deviation.

The deviation between the remeasured laundry weight data and the first laundry weight data may be obtained by comparing the amount of current measured at the laundry weight remeasurement step (S24) with the amount of current (first laundry weight data) stored after the laundry weight measurement step (S12).

When the deviation between the remeasured laundry weight data and the first laundry weight data is equal to or greater than the reference deviation (S25), it is determined that the laundry treatment apparatus has been overturned, the supply of current to the stator is interrupted to stop the rotation of the drum (S51) (a second interruption step), and a warning step (S52) of informing a user that the laundry treatment apparatus has been overturned is performed.

Meanwhile, unlike the embodiment shown in the figure, a step of determining whether the first laundry weight data is different from the remeasured laundry weight data may be performed, instead of the step (S25) of comparing the deviation between the remeasured laundry weight data and the first laundry weight data with the reference deviation. In this case, the second interruption step (S51) may be performed when the first laundry weight data is different from the remeasured laundry weight data.

Meanwhile, upon determining that the deviation between the remeasured laundry weight data and the first laundry weight data is less than the reference deviation (S25), a first unbalance remeasurement step (S26) is performed. The first unbalance remeasurement step (S26) is a step of measuring the magnitude of the dynamic unbalance based on the amount of current supplied to the stator while the number of rotations of the drum is maintained at the second number of rotations.

When the first unbalance remeasurement step (S26) is completed, it is determined whether the deviation between the dynamic unbalance measured at the first unbalance remeasurement step (S26) (remeasured first unbalance data) and the dynamic unbalance measured at the first unbalance measurement step (S14) (the first unbalance data) is equal to or greater than a predetermined first reference unbalance deviation (S27).

When the deviation between the remeasured first unbalance data and the first unbalance data is equal to or greater than the first reference unbalance deviation, it is determined that the laundry treatment apparatus has been overturned, and the step of stopping the rotation of the drum (S51) and the warning step (S52) are performed.

When the deviation between the remeasured first unbalance data and the first unbalance data is less than the first reference unbalance deviation, however, a second unbalance remeasurement step (S28) is performed. The second unbalance remeasurement step (S28) is a step of measuring the magnitude of the dynamic unbalance based on the amount of current supplied to the stator while the drum is accelerated to the third number of rotations.

Subsequently, it is determined whether the deviation between the dynamic unbalance measured at the second unbalance remeasurement step (S28) (remeasured second unbalance data) and the dynamic unbalance measured at the second unbalance measurement step (S17) (the second unbalance data) is equal to or greater than a predetermined second reference unbalance deviation (S29).

When the deviation between the remeasured second unbalance data and the second unbalance data is equal to or greater than the second reference unbalance deviation, it is determined that the laundry treatment apparatus has been overturned, and the step of stopping the rotation of the drum (S51) and the warning step (S52) are performed.

However, when the deviation between the remeasured laundry weight data and the first laundry weight data is less than the reference deviation, the deviation between the remeasured first unbalance data and the first unbalance data is less than the first reference unbalance deviation, and the deviation between the remeasured second unbalance data and the second unbalance data is less than the second reference unbalance deviation, the steps of maintaining the number of rotations of the drum at the target number of rotations (S31, S32, and S33) are performed.

The first reference unbalance deviation may be set to a deviation between the amount of current supplied to the stator to rotate the drum in the state in which the laundry treatment apparatus is not overturned and the amount of current supplied to the stator to rotate the drum in which the same weight of laundry is stored in the state in which the laundry treatment apparatus has been overturned.

The first reference unbalance deviation and the second reference unbalance deviation may be set to different values. Alternatively, the first reference unbalance deviation and the second reference unbalance deviation may be set to the same value, since each reference deviation is a difference value of current supplied to the stator to rotate the drum having the same load.

The above embodiments have been described based on a laundry treatment apparatus that is capable of washing laundry. Alternatively, the above embodiments may also be applied to a laundry treatment apparatus for drying laundry.

That is, the above embodiments may also be applied to a laundry treatment apparatus including a cabinet, a drum provided in the cabinet for storing laundry, a driving unit for rotating the drum, and an air supply unit for supplying heated air into the drum.

In the above embodiments, any type of current measuring instrument that is capable of measuring current that is supplied to the stator and transmitting the measured current to the controller (not shown) may be used as the means for measuring the amount of current that is supplied to the stator.

As is apparent from the above description, the present invention has the effect of providing a control method of a laundry treatment apparatus that is capable of determining whether the laundry treatment apparatus has been overturned without an additional sensor for determining whether the laundry treatment apparatus has been overturned.

In addition, the present invention has the effect of providing a control method of a laundry treatment apparatus that is capable of determining whether the laundry treatment apparatus has been overturned based on the fact that the amount of current supplied to a driving unit for rotating a drum in the state in which the laundry treatment apparatus is not overturned is different from the amount of current supplied to the driving unit for rotating the drum having the same load in the state in which the laundry treatment apparatus has been overturned.

In addition, the present invention has the effect of providing a control method of a laundry treatment apparatus that is capable of determining whether the laundry treatment apparatus has been overturned by measuring the amount of current supplied to a driving unit for rotating a drum in which laundry is stored.

In addition, the present invention has the effect of providing a control method of a laundry treatment apparatus that is capable of at least twice performing a step of determining the laundry weight based on the amount of current supplied to a driving unit for rotating a drum and comparing the measured values of the laundry weight to determine whether the laundry treatment apparatus has been overturned.

In addition, the present invention has the effect of providing a control method of a laundry treatment apparatus that is capable of at least twice measuring the magnitude of the mass unbalance (dynamic unbalance) of a drum in the circumferential direction about the center of rotation based on the amount of current supplied to a driving unit for rotating the drum and comparing the measured magnitudes of the dynamic unbalance to determine whether the laundry treatment apparatus has been overturned.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A control method of a laundry treatment apparatus comprising a tub configured to provide a space for storing water, a drum provided in the tub for storing laundry, a stator configured to generate a rotating field when current is supplied to the stator, a rotor configured to be rotated by the rotating field generated by the stator, a rotary shaft extending through the tub for connecting the rotor to the drum, and a controller configured to supply a current to the stator and measure an amount of current supplied to the stator, the control method comprising:
rotating the drum at a first predetermined RPM to measure a weight of the laundry stored in the drum a first time by measuring a variation of the amount of current supplied to the stator;
rotating the drum at a second predetermined RPM to measure a magnitude of a dynamic unbalance of the drum;
accelerating the drum to a target RPM, which is greater than the first predetermined RPM and the second predetermined RPM, when the magnitude of the dynamic unbalance is less than a predetermined reference value;
interrupting a rotation of the drum a first time when the variation per unit time of current supplied to the stator during the accelerating is equal to or greater than a predetermined reference variation;
rotating the drum at the first predetermined RPM to determine the weight of the laundry a second time stored in the drum; and
interrupting the rotation of the drum a second time when a deviation between the laundry weight measured the second time and the laundry weight measured the first time is equal to or greater than a predetermined reference deviation.

2. The control method according to claim 1, further comprising an RPM of the drum at the target RPM when the deviation between the laundry weight measured the second time and the laundry weight measured the first time is less than the reference deviation.

3. The control method according to claim 1, further comprising an RPM of the drum at the target RPM when the variation per unit time of current supplied to the stator during acceleration is less than the reference variation.

4. The control method according to claim 1, wherein the laundry weight measured the first time and the laundry weight measured the second time determine the laundry weight based on an amount of current supplied to the stator to accelerate the drum to the first predetermined RPM or to maintain the RPM of the drum at the first predetermined RPM.

5. The control method according to claim 4, wherein the interrupting the rotation of the drum the second time is performed when a deviation between the amount of current supplied to the stator when the laundry weight is measured the second time and the amount of current supplied to the stator when the laundry weight is measured the first time is equal to or greater than the reference variation.

6. The control method according to claim 5, wherein the reference deviation is set to a deviation between the amount of current supplied to the stator to rotate the drum at the first predetermined RPM in a state in which the laundry treatment apparatus has been overturned and the amount of current supplied to the stator to rotate the drum in which a same weight of laundry is stored at the first predetermined RPM in a state in which the laundry treatment apparatus is not overturned.

7. The control method according to claim 1, further comprising:
rotating the drum at the second predetermined RPM to remeasure the magnitude of the dynamic unbalance of the drum when the deviation between the laundry weight measured the second time and the laundry weight measured the first time is less than the reference deviation, wherein
the rotation of the drum is interrupted the time when a deviation between the second measured dynamic unbalance and the first measured dynamic unbalance is equal to or greater than a predetermined reference unbalance deviation.

8. The control method according to claim 7, wherein
the first and second measured dynamic unbalances are performed to determine the magnitude of the dynamic unbalance based on an amount of current supplied to the stator to maintain the RPM of the drum at the second predetermined RPM or to accelerate the drum to the second predetermined RPM, and
the rotation of the drum is interrupted the second time when a deviation between the amount of current supplied to the stator during the second measured dynamic unbalance and the amount of current supplied to the stator during the first measured dynamic unbalance is equal to or greater than the reference unbalance deviation.

9. The control method according to claim 8, wherein the reference unbalance deviation is set to a deviation between the amount of current supplied to the stator to rotate the drum at the second predetermined RPM in a state in which the laundry treatment apparatus has been overturned and the amount of current supplied to the stator to rotate the drum in which a same weight of laundry is stored at the second predetermined RPM in a state in which the laundry treatment apparatus is not overturned.

10. The control method according to claim 7, further comprising maintaining the RPM of the drum at the target RPM when the deviation between the second measured dynamic unbalance and the first measured dynamic unbalance is less than the reference unbalance deviation.

11. The control method according to claim 1, further comprising:
rearranging the laundry stored in the drum when the magnitude of the first measured dynamic unbalance is equal to or greater than the reference value, wherein the laundry untangling step comprises:
interrupting the rotation of the drum;
supplying water to the tub;
rotating the drum; and
draining the water from the tub.

12. The control method according to claim 1, wherein the measuring of the dynamic unbalance comprises:
measuring a first magnitude of the dynamic unbalance while rotating the drum at the second predetermined RPM, which is less than the first predetermined RPM; and
measuring a second magnitude of the dynamic unbalance while accelerating the drum to a third predetermined RPM, which is greater than the second predetermined RPM and less than the target RPM, and
the acceleration of the drum is performed when the first magnitude of the dynamic unbalance is less than a predetermined first reference value and when the second magnitude of the dynamic unbalance is less than a predetermined second reference value.

13. The control method according to claim 12, further comprising:
remeasuring the magnitude of the dynamic unbalance a first time while maintaining the RPM of the drum at the second predetermined RPM when the deviation between the laundry weight measured the second time and the laundry weight measured the first time is less than the reference deviation, wherein
the interrupting of the rotation of the drum the second time is performed when the deviation between the dynamic unbalance remeasured the first time and the first dynamic unbalance measured is equal to or greater than a predetermined first reference unbalance deviation.

14. The control method according to claim 13, further comprising:
remeasuring the magnitude of the dynamic unbalance a second time while accelerating the drum to the third predetermined RPM when the deviation between the dynamic unbalance remeasured the first time and the first dynamic unbalance measured is less than the first reference unbalance deviation, wherein
the interruption of the rotation of the drum the second time is performed when the deviation between the dynamic unbalance remeasured the second time and the second dynamic unbalance measured is equal to or greater than a predetermined second reference unbalance deviation.

15. The control method according to claim 14, further comprising:
maintaining the RPM of the drum at the target RPM to spin dry the laundry, wherein
the laundry is spin dried when the deviation between the laundry weight measured the second time and the laundry weight measured the first time is less than the reference deviation, when the deviation between the dynamic unbalance remeasured the first time and the first dynamic unbalance measured is less than the first reference unbalance deviation, and when the deviation between the dynamic unbalance remeasured the second time and the second dynamic unbalance measured is less than the second reference unbalance deviation.

* * * * *